(12) United States Patent
Aggarwal et al.

(10) Patent No.: US 11,044,352 B2
(45) Date of Patent: Jun. 22, 2021

(54) ADAPTIVE MULTI-PROTOCOL CONTROL OF A MEDIA DEVICE

(71) Applicant: Caavo Inc, Milpitas, CA (US)

(72) Inventors: Ashish D. Aggarwal, Stevenson Ranch, CA (US); Sharath H. Satheesh, Bangalore (IN); Rahul D. Nakhate, Maharashtra Pin (IN); Nino V. Marino, Alameda, CA (US); Vinod K. Gopinath, Bangalore (IN)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 16/219,342

(22) Filed: Dec. 13, 2018

(65) Prior Publication Data

US 2019/0191017 A1    Jun. 20, 2019

(30) Foreign Application Priority Data

Dec. 16, 2017   (IN) ............................. 201741045277

(51) Int. Cl.
| | |
|---|---|
| *H04L 29/06* | (2006.01) |
| *H04W 76/18* | (2018.01) |
| *H04W 36/00* | (2009.01) |
| *H04L 12/781* | (2013.01) |
| *H04W 48/18* | (2009.01) |

(52) U.S. Cl.
CPC .............. *H04L 69/24* (2013.01); *H04L 45/52* (2013.01); *H04L 69/18* (2013.01); *H04W 36/03* (2018.08); *H04W 76/18* (2018.02); *H04W 48/18* (2013.01)

(58) Field of Classification Search
CPC ......... H04L 69/24; H04L 69/18; H04L 45/52; H04W 76/18; H04W 36/03; H04W 48/18
USPC ....................................................... 709/228
See application file for complete search history.

(56) References Cited

U.S. PATENT DOCUMENTS

| | | | |
|---|---|---|---|
| 9,749,552 | B2 | 8/2017 | Gopinath et al. |
| 10,506,180 | B2 * | 12/2019 | Gopinath ......... H04N 21/42204 |
| 10,565,153 | B2 | 2/2020 | Kashyap et al. |
| 2006/0080707 | A1 | 4/2006 | Laksono |
| 2012/0249890 | A1 | 10/2012 | Chardon et al. |
| 2014/0022462 | A1 * | 1/2014 | Arling .................... G08C 17/02 |
| | | | 348/734 |
| 2014/0222862 | A1 | 8/2014 | Arling et al. |
| 2015/0033275 | A1 * | 1/2015 | Natani ............. H04N 21/42225 |
| | | | 725/110 |

(Continued)

*Primary Examiner* — Tauqir Hussain
(74) *Attorney, Agent, or Firm* — Fiala & Weaver P.L.L.C.

(57) ABSTRACT

Methods, systems, and apparatuses are described for an adaptive multi-protocol control of a device. A plurality of communication protocols suitable for communication with a particular device may be determined. A request may be received to control the device, such as a via a remote control, voice control, etc. A first communication protocol from among the plurality of communication protocols may be selected to transmit a first control signal. The first control signal may be transmitted to the device using the first communication protocol. In some implementations, a second communication protocol may be selected for transmitting a second control signal to the device, such as where the request may be associated with a plurality of control commands or where the device did not react to the first control signal. As a result, a device may be controlled using one or more communication protocols in an adaptive fashion.

20 Claims, 6 Drawing Sheets

(56) References Cited

U.S. PATENT DOCUMENTS

| | | | |
|---|---|---|---|
| 2017/0048577 A1* | 2/2017 | Chiou | H04N 21/42221 |
| 2017/0331870 A1* | 11/2017 | Giger | H04L 67/42 |
| 2018/0040237 A1* | 2/2018 | Arling | G08C 23/04 |
| 2018/0146233 A1* | 5/2018 | Satheesh | H04N 21/44008 |
| 2018/0357445 A1* | 12/2018 | Kowalik | H04W 12/08 |
| 2019/0043345 A1* | 2/2019 | Owrang | H04N 21/42226 |
| 2019/0379887 A1* | 12/2019 | Marino | H04N 17/04 |
| 2020/0204864 A1* | 6/2020 | Aggarwal | H04N 21/4725 |

* cited by examiner

ADAPTIVE MULTI-PROTOCOL CONTROL OF A MEDIA DEVICE

CROSS-REFERENCE TO RELATED APPLICATIONS

This application claims foreign priority to Indian Patent Application No. 201741045277, filed on Dec. 16, 2017, the entirety of which is incorporated by reference herein.

BACKGROUND

Technical Field

The subject matter described herein relates to an adaptive control of a media device using multiple communication protocols.

Description of Related Art

An entertainment system may comprise several audio/video (AV) devices connected to a television (TV) or high definition TV (HDTV). These devices may include, for example, a cable/satellite TV set top box (STB), an audio system, a Blu-ray® or DVD (digital versatile disc) player, a digital media adapter, a game console, a multimedia streaming device, etc. Each of these types of devices may be controlled using a plurality of communication protocols, such as an infrared (IR) and a radio-frequency (RF) communication protocols. However, the selection of which of the plurality of communication protocols to use is generally determined manually by a user (e.g., by selecting a particular remote control or device to communicate with the media device). If the media device does not respond to the user's intended control of the device using the first communication protocol, the user must manually determine a secondary communication protocol to use, and/or select a separate controller to control the media device.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for an adaptive multi-protocol control of a device. A plurality of communication protocols suitable for communication with a particular device may be determined. A request may be received to control the device, such as a via a remote control, voice control, etc. A first communication protocol from among the plurality of communication protocols may be selected to transmit a first control signal. For example, a particular RF communication protocol may be selected for transmitting the first control signal. The first control signal may be transmitted to the device using the first communication protocol, thereby enabling control of the device via the selected protocol.

In some implementations, a second communication protocol may be selected for transmitting a second control signal to the device, such as where the request may be associated with a plurality of control commands or where the device did not react to the first control signal. As a result, a device may be controlled using one or more communication protocols in an adaptive fashion.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
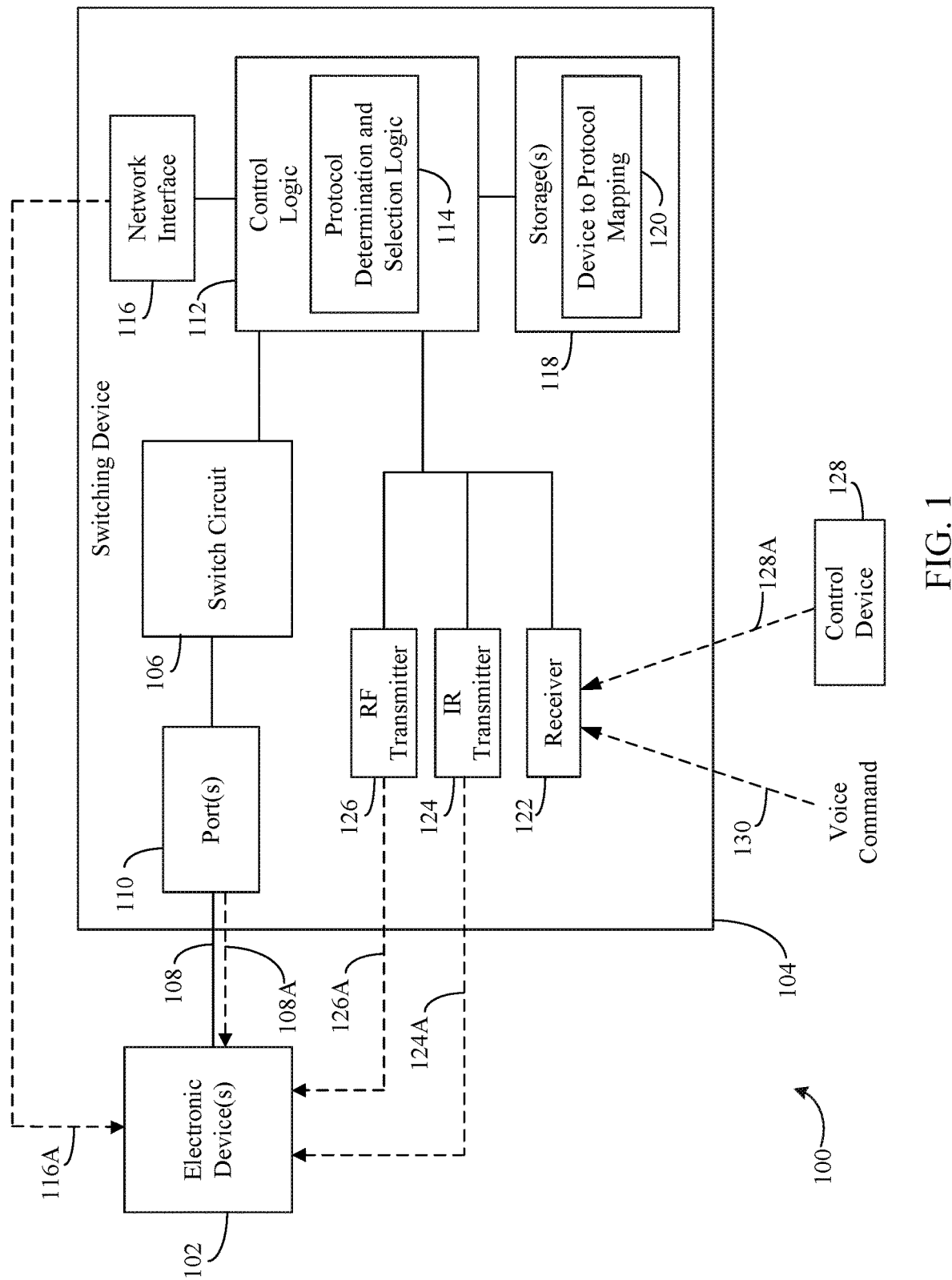
FIG. 1 is a block diagram of an example multimedia switching device in accordance with embodiments described herein.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

II. Example Embodiments

An entertainment system may comprise several AV devices connected to a TV or HDTV. These devices may include, for example, a cable/satellite TV STB, an audio system, a Blu-ray® or DVD player, a digital media adapter, a game console, a multimedia streaming device, etc. Each of these types of devices may be controlled using a plurality of communication protocols, such as an IR and a radio-frequency RF communication protocol. However, the selection of which of the plurality of communication protocols to use is generally determined manually by a user (e.g., by selecting a particular remote control or device to communicate with the media device). If the media device does not respond to the user's intended control of the device using the first communication protocol, the user must manually determine a secondary communication protocol to use, and/or select a separate controller to control the media device.

Techniques are described herein to enable the communication with a media device using at least one of a plurality of communication protocols. In accordance with embodiments, it is determined which communication protocols are suitable for communicating with a media device (e.g., a media streaming device, a STB, a TV, etc.). A request to control a media device may be received, such as via a remote control, a voice command, etc. The request may comprise, for example, a user-initiated request to power on or power off a media device, adjust a volume setting, launch an application, etc. In response to receiving a request to control the media device, one of the communication protocols may be selected for communicating a control signal to the media device and the control signal may thereby be transmitted to the media device using the selected communication protocol.

For example, a media device may be capable of receiving control signals using a number of different communication protocols (e.g., over IR, RF, High-Definition Multimedia Interface Consumer Electronics Control (HDMI-CEC), and/or Internet Protocol (IP)). A switching device coupled to the media device may determine whether it can communicate with the media device using each of the different communication protocols. In embodiments, the switching device may further determine which particular commands (e.g., to power on a media device, to switch an input of the media device, etc.) are suitable for communication with the media device using each of the different communication protocols. When a user decides to control the media device (e.g., via a voice input or by using a remote-control device), the switching device may select one of the communication protocols (e.g., IR), and transmit the control signal to the media device using the selected communication protocol. The selection may be based on one or more factors, such as power state of the media device, a network state of the media device, the received request, and/or a user preference.

In some other implementations, the switching device may further be configured to transmit a second control signal to the media device using a second communication protocol. In one example, the switching device may determine that the media device did not react to the first control signal transmitted over the first communication protocol (e.g., an IP signal), and may transmit a control signal to control the media device using one or more backup communication protocols (e.g., an IR signal). In another example, it may be determined that a received request requires a plurality of control signals transmitted to the media device (e.g., turning on a device and changing an input of the device). In such an example, the switching device may be configured to transmit a first control signal over a first communication protocol (e.g., IR), and a second control signal over a second communication protocol (e.g., IP or RF). In this manner, a media device may be adaptively controlled via a plurality of communication protocols.

FIG. 1 is a block diagram of a system 100 that is configured to select one of a plurality of communication protocols to communicate with an electronic device, in accordance with an embodiment. As shown in FIG. 1, system 100 includes one or more electronic device(s) 102, a switching device 104, and a control device 128.

In the illustrative example shown in FIG. 1, electronic device(s) 102 may be source devices configured to provide audio and/or video signals. Electronic device(s) 102 may also include sink devices configured to receive audio and/or video signals. For instance, electronic device(s) 102 may be a Blu-Ray™ player, a STB, a streaming media player, a TV, an HDTV, and/or a projector. The types of electronic devices are only illustrative, and electronic device(s) 102 may be any electronic device capable of providing and/or playing back AV signals.

Figure 4:
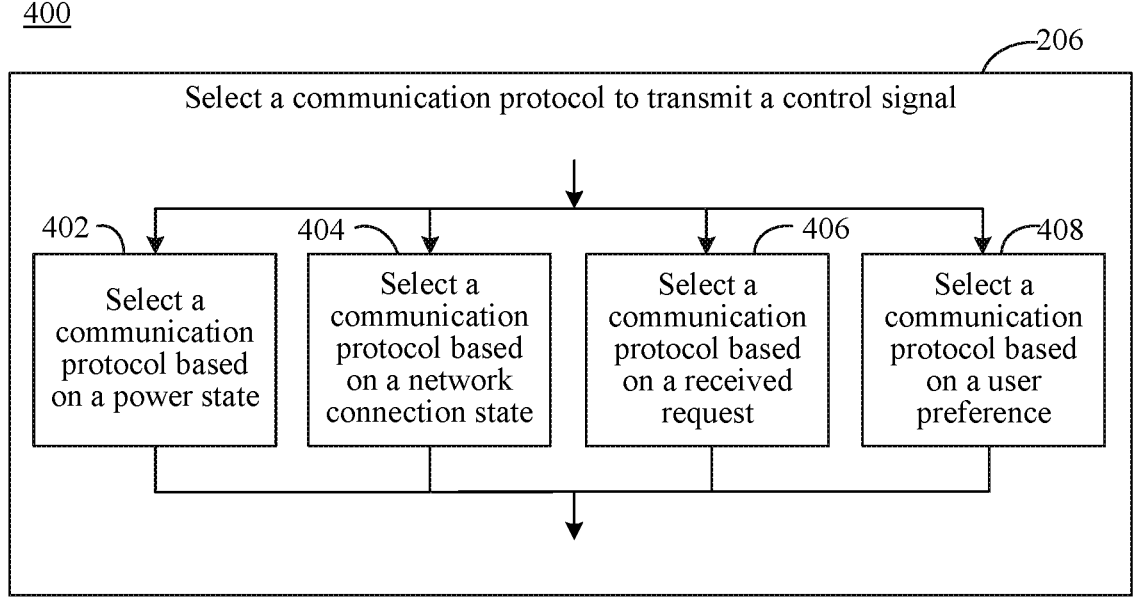
FIG. 4 is a flowchart of a method for selecting a communication protocol to transmit a control signal, according to an example embodiment.

As shown in FIG. 4, switching device 104 includes AV port(s) 110, a switch circuit 106, control logic 112, protocol determination and selection logic 114, a network interface 116, one or more storage(s) 118, a device to protocol mapping 120, a receiver 122, an IR transmitter 124, and an RF transmitter 126. As further shown in FIG. 1, electronic device(s) 102 are coupled to AV port(s) 110. In embodiments, electronic device(s) 102 may be coupled to AV port(s) 110 via a High-Definition Multimedia Interface (HDMI) cable 108, although implementations may include other types of AV cables or interfaces. Port(s) 110 may be further configured to transmit a control signal 108A to electronic device(s) 102 using an HDMI-CEC communication protocol. Although it is described herein that control signal 108A may be transmitted using an HDMI-CEC communication protocol, it is understood that control signal 108A may include any other suitable transmission over the HDMI cable interface, or any other signaling protocol available with other types of audio/video interfaces. AV port(s) 110 may be automatically configured to be source AV ports or sink AV ports upon connecting electronic device(s) to AV port(s) 110.

Although it is described that embodiments in accordance with the techniques herein may be part of a multimedia switching device, it is understood and appreciated that any other device that communications or controls another electronic device may utilize the techniques described. For example, any one or more of AV port(s) 110, switch circuit 106, control logic 112, protocol determination and selection logic 114, network interface 116, storage(s) 118, device to protocol mapping 120, receiver 122, IR transmitter 124, and RF transmitter 126 may be implemented in a remote control (e.g., a universal remote control), a smartphone, a tablet, a computer, or any other device that can communicate or control another electronic device using one or more communication protocols.

Switch circuit 106 may be configured to connect a particular source AV port (e.g., one of AV port(s) 110) to a particular one or more sink AV ports (e.g., another one of AV port(s) 110) based, for instance, on a command such as a user-initiated command. Additional details regarding the auto-configuration of AV port(s) may be found in U.S. patent application Ser. No. 14/945,079, filed on Nov. 18, 2015 and entitled "Auto Detection and Adaptive Configuration of HDMI Ports," the entirety of which is incorporated by reference. Furthermore, additional details regarding the identification of electronic device(s) and the mapping of electronic device(s) to AV port(s) may be found in U.S. patent application Ser. No. 14/945,125, filed on Nov. 18, 2015 and entitled "Automatic Identification and Mapping of Consumer Electronic Devices to Ports on an HDMI Switch," the entirety of which is incorporated by reference.

Receiver 122 comprise a receiver configured to receive command(s) that indicate that a user would like to use one or more of electronic device(s) for providing and/or presenting content. For example, receiver 122 may be configured to receive such command(s) from control device 128 (or any other control devices not shown in FIG. 1).

In accordance with an embodiment, control device 128 may be operable to transmit a request to control any one or more of electronic device(s) 102 by transmitting a control signal 128A. In accordance with an embodiment, the control signals are transmitted via a wired connection (e.g., via a Universal Serial Bus (USB) cable, a coaxial cable, etc.). In accordance with another embodiment, the control signals are transmitted via a wireless connection (e.g., via infrared (IR) communication, radio frequency (RF) communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.) and/or the like.

In accordance with an embodiment, control device 128 is a remote-control device, a desktop computer, a mobile device, such as a telephone (e.g., a smart phone and/or mobile phone), a personal data assistance (PDA), a tablet, a laptop, etc. In accordance with another embodiment, control device 128 is a dedicated remote-control device including smart features such as those typically associated with a smart phone (e.g., the capability to access the Internet and/or execute variety of different software applications), but without the capability of communicating via a cellular network.

A user may use control device 128 to select a source device and/or a sink device that the user would like to use for providing and/or presenting content. After making a selection, control device 128 may transmit a command 128A to receiver 122 that includes an identifier of the selected source and/or sink devices. The identifier may include, but is not limited to, the type of the electronic device (e.g., a Blu-ray player, a DVD player, a set-top box, a streaming media player, a TV, a projector etc.), a brand name of the electronic device, a manufacturer of the electronic device, a model number of the electronic device, and/or the like. In an embodiment, control device 128 may also identify a particular command to be carried out on one or more of electronic device(s) 102, such as a command to power on a device, switch an input of a device, adjust a volume of a device, launch an application and/or multimedia content on a device, etc.

Receiver 122 may also be configured to receive one or more voice commands 130 from a user that identify electronic device(s) (e.g., electronic device(s) 102) a user would like to use for providing and/or presenting content. For example, the user may utter one or more commands or phrases that specify electronic device(s) that the user would like to use (e.g., "Watch DVD," "Watch satellite TV using projector," "Turn on streaming media device"). The command(s) may identify electronic device(s) by one or more of the following: a type of the electronic device, a brand name of the electronic device, a manufacturer of the electronic device, a model number of the electronic device and/or the like. In accordance with an embodiment, receiver 122 may comprise a microphone configured to capture audio signals. In accordance with such an embodiment, receiver 122 and/or another component of switching device 104 is configured to analyze audio signals to detect voice commands included therein. It is noted and understood that receiver 122 may comprise any number of signal receivers, such as one or more separate receivers for each communication protocol associated with control device 128, and/or one or more combined receivers configured to receive signals over a plurality of communication protocols.

In accordance with another embodiment, the microphone is included in control device 128. In accordance with such an embodiment, control device 128 is configured to analyze the audio signal received by the microphone to detect voice command(s) included therein, identify the electronic device(s) specified by the user, and/or transmit command(s) including identifiers for the identified electronic device(s) to receiver 122. After receiving such command(s), receiver provides the identifier(s) included therein to a mapping component (not shown) in control logic 112. Based on the identifier(s) in the mapping component, control logic 112 may be configured to provide a control signal to switch circuit 106, which causes switch circuit 106 to connect the identified source AV port to the identified and/or determined sink AV port.

Switching device 104 may be further configured to transmit a control signal to any of electronic device(s) 102. The control signal may be any type of signal to control one or more electronic device(s) 102, such as a signal to control a power state, an input, an output, an audio setting, a video setting, or any other setting of electronic device(s) 102. In embodiments, electronic device(s) 102 may be configured to receive control signals via any one or more communication protocols. For example, as shown in FIG. 1, switching device 104 may transmit to electronic device(s) 102 an IP control signal 116A via a network interface 116, a IR control signal 124A via an IR transmitter 124, an RF control signal 126A via an RF transmitter 126, and/or a HDMI-CEC control signal 108A via an HDMI interface 108. In some example implementations, switching device 104 may be configured to transmit control signals to the same electronic device using a plurality of different communication protocols, as described in more detail below.

Network interface 116 is configured to enable switching device 104 to communicate with one or more other devices (e.g., electronic device(s) 102) via a network, such as a local area network (LAN), wide area network (WAN), an ethernet, and/or other networks, such as the internet. In accordance with embodiments, network interface 116 may transmit an IP control signal 116A over the network to control one or more functions of electronic device(s) 102. Network interface 116 may include any suitable type of interface, such as a wired and/or wireless interface. In embodiments, network interface 116 may further enable switching device 104 with two-way communication with one or more remote (e.g., cloud-based) systems (not shown). For instance, a remote system, such as a cloud-based server, may identify one or more communication protocols that may be suitable for communication with electronic device(s), and/or particular commands suitable for communication with the electronic device(s) using the one or more communication protocols.

IR transmitter 124 may transmit an IR control signal 124A using any suitable IR protocol known and understood to those skilled in the art. For instance, IR transmitter 124 may transmit an IR control signal 124A to be received by a suitable IR receiver of the receiving electronic device. In some examples, IR control signal 124A may be transmitted via one or more repeaters or IR signal blasters (not shown), such as a line-of-sight is not present between receiver 122 and the receiving electronic device (e.g., where a device may behind a physical obstruction, such as in a cabinet or a closet).

RF transmitter 126 may transmit an RF control signal via any suitable type of RF communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.), and/or the like.

Storage(s) 118 may be one or more of any storage device described herein, such as, but not limited to, those described below with respect to FIG. 8. Storage(s) 118 may include a device to protocol mapping 120, which may comprise, for instance, an identification of the particular communication protocols suitable for communication with one or more of electronic device(s) 102. Device to protocol mapping 120 may include a data structure (e.g., a table/database, or the like) containing one or more rules that associate a particular communication protocol with a given electronic device and/or type of command. For instance, device to protocol mapping 120 may indicate that switching device 104 can communicate with a particular electronic device using certain protocols (e.g., IR and IP-based communications). In another embodiment, device to protocol mapping may further identify, for a particular electronic device, the types of commands (e.g., a power command, a standby wake-up command, etc.) suitable for communication over each of the communication protocols. In another embodiment, device to protocol mapping 120 may prioritize the communication protocols (e.g., transmit an IR control signal 124A prior to transmitting an IP control signal 116A) to use for each device and/or command.

In yet another embodiment, device to protocol mapping 120 may be obtained by communicating with one or more electronic device(s) 102 to determine the communication protocols suitable for communicating commands to the devices (e.g., through a handshake between switching device 104 and electronic device(s) 102). In other embodiments, device to protocol mapping 120 may be obtained, in whole or in part, from a remote system (e.g., a cloud-based system, not shown) containing a repository (e.g., by downloading the mapping), or may be obtained manually through one or more user inputs identifying the communication protocols suitable for communication with each device. In yet another embodiment, device to protocol mapping 120 may be obtained, in whole or in part, by testing one or more command types using a plurality of available communication protocols for each electronic device.

Control logic 112 may include protocol determination and selection logic 114 configured to manage the manner in which switching device 104 communicates with electronic device(s) 102. In embodiments, protocol determination and selection logic 114 may be configured to, among other things, determine or identify which one or more communication protocols are suitable for communication with electronic device(s) 102. For instance, protocol determination and selection logic 114 may identify which communication protocols are suitable to transmit a control signal based on information contained within device to protocol mapping 120. In another embodiment, protocol determination and selection logic 114 may transmit a plurality of test commands to electronic device(s) 102 using each of a plurality of communication protocols and store an indication in device to protocol mapping 120 whether the communication protocol is suitable for communicating the command to the electronic device.

Protocol determination and selection logic 114 is further configured to select (e.g., in response to receiving a user command) one or more of the communication protocols to transmit a control signal to electronic device(s) 102. For instance, based on the user command and device to protocol mapping 120, protocol determination and selection logic 114 may select a particular communication protocol (e.g., an IR-based signal) to transmit a certain command (e.g., a power signal). Once the electronic device is powered on, protocol determination and selection logic 114, based on the user command and device to protocol mapping 120, may transmit subsequent commands to the same electronic device via another one or more of the same communication protocols, and/or one or more different communication protocols (e.g., an IP-based command via network interface 116).

Figure 2:
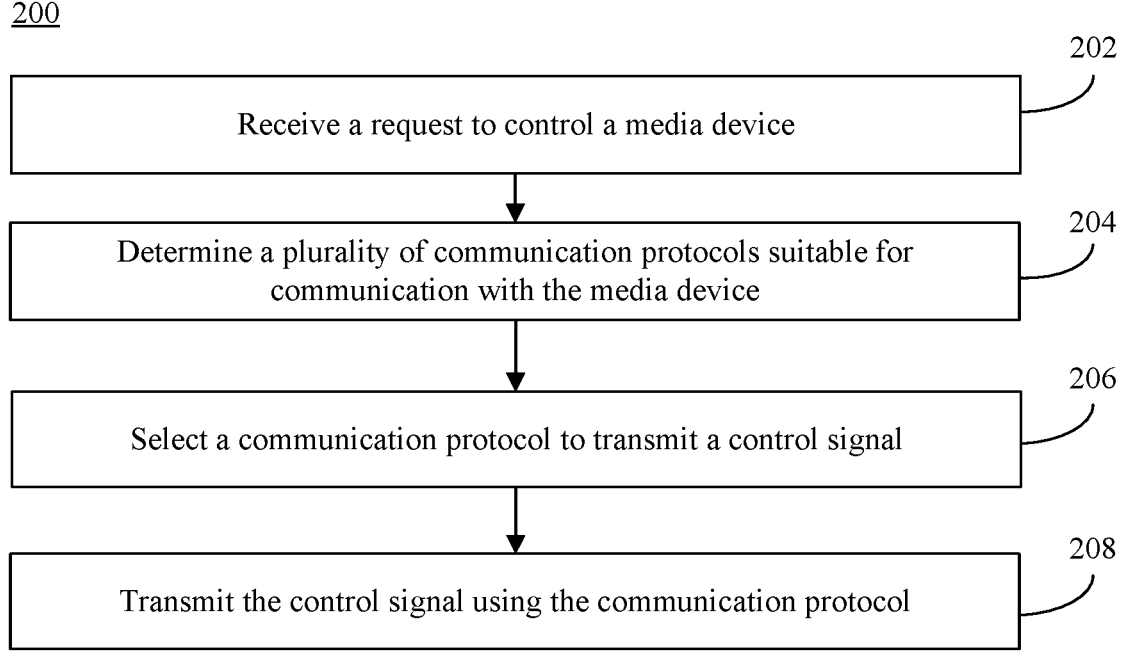
FIG. 2 is a flowchart of a method for selecting a communication protocol to transmit a control signal to a media device, according to an example embodiment.
Figure 3:
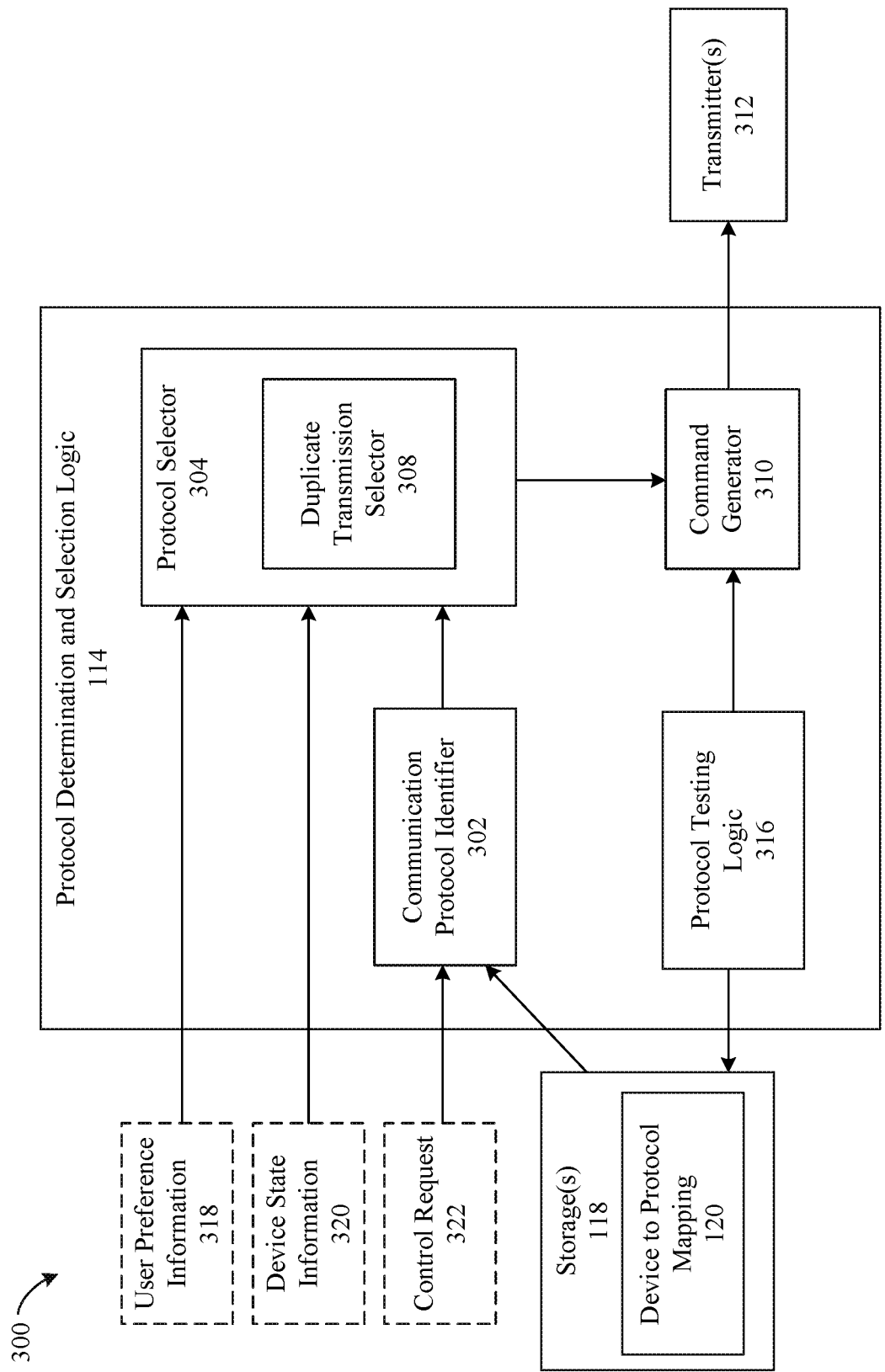
FIG. 3 is a block diagram of a system comprising logic for determining and selecting a communication protocol, according to an example embodiment.

FIG. 2 depicts a flowchart 200 of a method for selecting a communication protocol to transmit a control signal to a media device, according to an example embodiment. The method of flowchart 200 will now be described with continued reference to the system of FIG. 1, although the method is not limited to that implementation. For illustrative purposes, flowchart 200 and protocol determination and selection logic 114 are described as follows with respect to FIG. 3. FIG. 3 shows a block diagram of a system comprising logic for determining and selecting a communication protocol, according to an example embodiment. As shown in FIG. 3, system 300 includes protocol determination and selection log 114, storage(s) 118, and one or more transmitter(s) 312. Protocol determination and selection logic 114 includes a communication protocol identifier 302 that may obtain a control request 322, a protocol selector 304, a command generator 310, and protocol testing logic 316. As shown in FIG. 3, protocol selector 304 includes a duplicate transmission selector 308. Furthermore, protocol selector 304 may obtain user preference information 318 and/or device state information 320. Other structural and operational embodiments will be apparent to persons skilled in the relevant art(s) based on the discussion regarding flowchart 200 and the system of FIG. 3. Flowchart 200 and system 300 are described in further detail as follows.

As shown in FIG. 2, the method of flowchart 200 begins at step 202. In step 202, a request to control a media device is received. For instance, with reference to FIG. 3, communication protocol identifier 302 may be configured to receive a control request 322 that comprises a request to control a media device, such as one or more of electronic device(s) 102. Control request 322 may comprise any time of request, such as a user-initiated request to control a device coupled to switching device 104 via receiver 122. The request may be received in any suitable manner, such as via voice command 130 or via a control signal 128A from control device 128 (e.g., a remote control, a smartphone, etc.).

In example embodiments, control request 322 to control electronic device(s) 102 may comprise any type of command to be applied to electronic device(s) 102. For instance, where the electronic device to be controlled is a source device, control request 322 may comprise, as non-limiting examples, a request to power on or power off one of electronic device(s) 102, conduct a search on one of electronic device(s) 102, launch an application or a particular item of multimedia content on one of electronic device(s) 102, change an audio and/or video setting, navigate to a particular menu, screen, or selectable icon, or any other command that may be applied to the electronic device. In other instances, such as where electronic device(s) comprise a source device, control request 322 may include any command that may be transmitted to such a device, such as a command to power on or off the device, change an audio setting (e.g., volume) or a video setting, etc. It is noted and understood that these examples are not intended to be limiting, and control request 322 may include any additional commands not expressly described herein.

In step 204, a plurality of communication protocols suitable for communication with the media device is determined. For example, with reference to FIG. 3, communication protocol identifier 302 may determine communication protocols suitable for communication with one or more of electronic device(s) 102. In embodiments, communication protocol identifier 302 may obtain and/or identify the communication protocols suitable for communicating with each of the electronic devices based on device to protocol mapping 120. For instance, device to protocol mapping 120 may indicate that switching device 104 may communicate with a particular one of electronic device(s) 102 using any one or more of an HDMI-CEC control signal 108A, an IP control signal 116A, an IR control signal 124A, and/or an RF control signal 126A. For example, device to protocol mapping 120 may indicate, for a certain device, that communications may be possible using IP control signal 116A and IR control signal 124, but not possible using one or more additional communication protocols. This example is illustrative only, and device to protocol mapping 120 may identify any one or more communication protocols (or combinations thereof) that may be suitable for communicating with a given device.

In example embodiments, communication protocol identifier 302 may be further configured to determine the protocols suitable for communication with a media device based on characteristics or parameters of a media device, such as a brand, make, and/or model of the media device. For instance, device to protocol mapping 120 may comprise a library, catalog, or repository of media devices (e.g., known or commonly available media devices) along an identification of each communication protocol suitable for communication with the media device. In one non-limiting example, device to protocol mapping 120 may indicate that switching device 104 may communicate with a particular brand, make, and/or model of a television using certain communication protocols.

In some other example embodiments, device to protocol mapping 120 may further comprise one or more different command types that may be communicated using each of the communication protocols. For instance, device to protocol mapping 120 may indicate that certain commands may be transmitted to an electronic device using a particular communication protocol, while other commands may be transmitted to the same device using a different communication protocol. In other examples, device to protocol mapping may indicate that certain commands may be transmitted to the electronic device using several different communication protocols. As an illustrative example, device to protocol mapping 120 may indicate that a power command may be suitable for communication with a Roku® streaming media device using an IR or RF communication protocol, but not an IP communication protocol. In some further examples, device to protocol mapping 120 may identify separate communication protocols suitable for communicating a power on and a power off command to an electronic device, such as where an electronic device may enter a low power, standby, or deep sleep state that prevents receiving communications over certain protocols (e.g., IP-based commands).

In embodiments, device to protocol mapping 120 may be stored locally on switching device 104, or may be obtained remotely (e.g., from a cloud-based server). For instance, device to protocol mapping 120 may be generated on a remote computer, server, or other device, and be transmitted to switching device 104 for storage, such as via network interface 116. In implementations, therefore, a library, catalog or repository contained in device to protocol mapping 120 may be continuously updated such that switching device 104 may be adaptable to new devices and/or newly supported communication protocols for existing electronic devices in device to protocol mapping 120. Device to protocol mapping 120 may comprise a subset of devices in a library, catalog or repository (e.g., only the devices coupled to switching device 104), or may comprise additional devices (e.g., devices that were previously coupled to switching device 104 or the entire library, catalog or repository).

Information in device to protocol mapping 120 may be stored in a variety of ways. In one implementation, as described above, device to protocol mapping 120 may be obtained from a remote source (e.g., a server). In another implementation, device to protocol mapping 120 may comprise a mapping that may be generated in whole or in part based on a user input. For instance, an interactive user interface may be provided in which a user may identify which communication protocols are suitable for communication with one or more of electronic device(s) 102. In some other example implementations, such as where one or more elements of a mapping between devices and suitable communication protocols may be incomplete or unknown, protocol determination and selection logic 114 may prompt a user via an interactive user interface to identify information for such a mapping. For instance, if a particular media device is known or expected to have network capabilities, protocol determination and selection logic 114 may prompt a user to confirm whether such network capabilities exist, and if so, connect the media device to the network to which switching device 104 is coupled to enable an IP communication protocol between the two devices. As a result, device to protocol mapping 120 may store an indication that the media device may be controlled via an IP communication protocol (or any other protocol as described herein).

At step 206, a communication protocol is selected to transmit a control signal. For instance, with reference to FIG. 3, protocol selector 304 may select a particular communication protocol to transmit a control signal to one of electronic device(s) from among the plurality of communication protocols suitable for communication with the device (e.g., as determined by communication protocol identifier 302). As an illustrative example, communication protocol identifier 302 may that a control signal corresponding to control request 322 may be transmitted to electronic device (s) 102 via several different communication protocols based on device to protocol mapping 120. Based on the different communication protocols, protocol selector 304 may select a particular one of the communication protocols (e.g., an IP-based control command) to transmit a control signal corresponding to control request 322 to one of electronic device(s) 102.

In some example embodiments, communication protocol identifier 302 may also be configured to obtain a prioritization of communication protocols from device to protocol mapping 120, such that one or more communication protocols may be identified as a higher or lower priority for transmitting control signals than one or more other communication protocols. In such examples, protocol selector 304 may be configured to select a first communication protocol among the plurality of communication protocols that has a higher priority. For example, switching device 104 may be able to communicate with a particular one of electronic device(s) 102 using several communication protocols (e.g., IR, RF, HDMI-CEC, and IP), but certain communication protocols (e.g., HDMI-CEC) may be determined to be more reliable than other protocols for certain types of commands. In such instances, the particular communication protocols that are more reliable for those types of commands may be provided with a higher priority, and therefore protocol selector 304 may select such protocols first when attempting to communicate with the electronic device. This example is not limiting, however, and it is understood that a prioritization of communication protocols for one electronic device may be different than the prioritization for another electronic device.

In addition, the prioritization may further depend on a particular system configuration in some instances, such as where a device (e.g., an HDTV) may be capable of IP control commands but the HDTV is not coupled to a network through which IP communications may be transmitted. In another situation, a media device (e.g., a STB) may comprise an IR receiver, but the receiver may be located behind a cabinet that obstructs the transmission of IR signals. While such configurations are illustrative only, it is therefore understood that prioritizations for a given device may depend on a number of factors.

As one non-limiting example, protocol selector 304 may select IR control signal 124A to transmit a control signal corresponding to a power command (e.g., to power on or off a device, or to wake a device from a sleep state). As described in greater detail below, if IR control signal 124A is not successful, duplicate transmission selector 308 may retransmit one or more signals corresponding to the power command via one or other communication protocols (e.g., HDMI-CEC control signal 108A, IP control signal 116A, and/or RF control signal 126A).

In some further examples, protocol selector 304 may be configured to select a plurality of communication protocols, such as where control request 322 comprises a request that corresponds to a sequence of commands. For instance, control request 322 may comprise a request to power on a particular electronic device and launch an application on the device. In such an example, protocol selector 304 may select a particular communication protocol (e.g., an IR communication protocol) to power on a device, followed by a different protocol (e.g., an IP communication protocol) to navigate the electronic device to launch an application.

At step 208, the control signal is transmitted to the media device using the communication protocol. For instance, with reference to FIG. 3, command generator 310 may be configured to generate a command for transmission to one of transmitter(s) 312. The command generated by command generator 310 may comprise one or more commands corresponding to the request (e.g., a user-initiated command, such as a voice command or a command transmitted by a remote-control device) for transmission to the media device, such as command to power on or off a device, switch an input, modify an audio/video setting, etc. In implementations, command generator 310 may generate the one or more commands based on the communication protocol selected by protocol selector 304. For instance, if protocol selector 304 selects an infrared communication protocol for transmission of a particular command, command generator 310 may be configured to generate a command for transmission using an infrared communication protocol as understood by those skilled in the relevant arts.

In example embodiments, command generator 310 may provide the generated command comprising the control signal to transmitter(s) 312 for transmission to one of electronic device(s). For instance, transmitter(s) 312 may comprise one or more of the transmitters described with reference to FIG. 1, such as IR transmitter 124 for transmitting IR signal 124A, RF transmitter 126 for transmitting RF signal 126A, network interface 116 for transmitting IP control signal 116A, and/or HDMI cable 108 for transmitting HDMI-CEC control signal 108A, or any other transmitters for transmitting control signals using communication protocols not expressly described herein and understood by those skilled in the relevant arts. For instance, continuing with the illustrative example described earlier, if protocol selector 304 selects an IR communication protocol for transmitting a particular control signal corresponding to control request 322, an IR transmitter of switching device 104 may transmit the control signal for receipt by an IR receiver of the receiving electronic device.

In this manner, a suitable communication protocol from among a plurality of available communication protocols may be selected and used to transmit a control signal to an electronic device in an adaptable fashion. As a result, switching device 104 may control each of a plurality of electronic devices based on, for example, the most effective and/or reliable prioritization of communication protocols for various types of commands, enabling a dynamic and accurate control of each device.

In accordance with example embodiments, selection of a communication protocol to transmit a control signal may be performed in a variety of ways. For instance, protocol selector 304 may select a particular communication protocol from among a plurality of suitable communication based, at least in part, on a number of factors. FIG. 4 is a flowchart of a method for selecting a communication protocol to transmit a control signal, according to an example embodiment. For illustrative purposes, FIG. 4 will be described with continued reference to systems 100 and 300 of FIGS. 1 and 3, respectively. Other structural and operational embodiments will be apparent to persons skilled in the relevant art(s)

based on the discussion regarding flowchart 400 and the systems of FIGS. 1 and 3. Flowchart 400 and systems 100 and 300 are described in further detail as follows.

In step 402, a communication protocol is selected based, at least in part, on a power state. For instance, with reference to FIGS. 1 and 3, protocol selector 304 may select a communication protocol from among a plurality of available communication protocols based, at least in part, on a power state of one of electronic device(s) 102. For example, certain electronic devices may disable the functionality of one or more communication protocols (e.g., disabling a network connection) if the device enters a deep sleep state, a power saving state, or is powered off. In examples, therefore, protocol selector 304 may receive device state information 320 which may include, among other things, information associated with a device's power state. For example, device state information 320 may be based on a video signal (or lack thereof) received from the electronic device (e.g., no video signal, a video signal representing a screensaver or other sleep state or low-power mode), an audio signal (or lack thereof), a predetermined delay period (e.g., an indication that a certain time has passed since a particular electronic device was last used, etc.).

Accordingly, in example implementations, if control request 322 includes a request that particular one of electronic device(s) 102 is to be used and device state information 320 indicates that the electronic device is in a deep sleep state, a power saving state, or is powered off, protocol selector 304 may automatically select a particular communication protocol (e.g., an IR communication protocol) based on the device's current power state. In some examples, protocol selector 304 may be configured to select one or more communication protocols that are known to be able to communicate with the device despite the device being in such a state, such as an IR communication protocol. In other words, because an electronic device may shut down or disable certain communication protocols during a deep sleep, power saving, or off state, protocol selector 304 may select a communication protocol as a backup communication protocol that is used for such low-power states, while using one or more other communication protocols once the electronic device wakes up or is powered on.

In step 404, a communication protocol may be selected, based at least in part, on a network connection state. For instance, with reference to FIG. 3, protocol selector 304 may select a particular communication protocol from among a plurality of suitable communication protocols based, at least in part, on a state of a network connection of one of electronic device(s). For example, protocol selector 304 may determine, based on device to protocol mapping 120, that a particular control signal corresponding to control request 322 is to be transmitted to one of electronic device(s) 102 via IP control signal 116A over a network connection. However, in some instances, device state information 320 may indicate to protocol selector 304 that a network connection between switching device 104 and the electronic device may be disconnected, unreliable, or otherwise not available. In this scenario, upon determining that the network connection is not available or suitable for transmitting the control signal using IP control signal 116A, protocol selector 304 may automatically select another communication protocol (e.g., an IR, RF, or HDMI-CEC communication protocol) to transmit the control signal corresponding to the user request.

In this manner, instead of transmitting, or attempting to transmit, an IP control signal over a communication protocol that is unlikely to work, protocol selector 304 may automatically select a different communication protocol from among a plurality of communication protocols that is suitable for communication with the device as a secondary or alternative protocol. The secondary protocol may comprise, for instance, a communication protocol that is known and/or expected to succeed when transmitted to the electronic device (e.g. an IR communication protocol). Upon reestablishment of the network connection, protocol selector 304 may resume a selection of an IP control signal to transmit certain control commands. As a result, the selection of communication protocols to control one or more electronic devices may be adaptable based on the current state of a network connection of switching device 104 and/or the electronic devices, enabling a seamless and continuous control of the devices in the event of an outage.

In step 406, a communication protocol may be selected, at least in part, based on a received request. For instance, with respect to FIG. 3, protocol selector 304 may be configured to select a particular communication protocol to transmit a control signal based, at least in part, on control request 322 corresponding to a user-initiated request described above. As described above, in some example embodiments, it may be determined that certain types of commands (e.g., power on commands) are more reliable and/or effective when transmitting using a particular communication protocol, such as an IR communication protocol, while certain other types of commands (e.g., launching an application, navigating a user interface, selecting multimedia content, etc.) are more effective using a different communication protocol, such as one or more of an IP, RF, or HDMI-CEC communication protocol. As a result, protocol selector 304 may select a particular communication protocol based, at least in part, on the type of command to be transmitted the electronic device. In other words, protocol selector 304 may be configured to select a one or more communication protocol for certain types of control commands, while selecting one or more different communication protocols for other types of control commands for the same electronic device. In this way, protocol selector 304 may select the most appropriate protocol based on the type of command to be issued, thereby enabling accurate and reliable control of electronic device(s) 102.

In step 408, a communication protocol may be selected, at least in part, based on a user preference. For instance, with reference to FIG. 3, protocol selector 304 may be configured to select a particular communication protocol from among a plurality of communication protocols, based at least in part, on user preference information 318 that indicates one or more user preferences for the selection of a protocol. For example, protocol selector 304 may prompt a user, through a user interface (not shown), with an option to select and/or modify one or more suitable communication protocols to use for communicating with the electronic device. In another embodiment, a user may add, delete, and/or modify any rules, such as prioritization rules, contained within device to protocol mapping 120. For instance, if a user may specify that a particular communication protocol should never (or always) be used to communicate with a particular electronic device, or may alter a priority associated with certain communication protocols for a particular electronic device.

For example, if a user places an electronic device in a closet or cabinet where a physical barrier exists that may obstruct the receipt of IR signals from switching device 104 (or locates switching device 104 behind a closet), user preference information 318 may indicate, based on a user preference, that an IR protocol should not be used. In another example, user preference information 318 may set a lower priority for IR-based signals where an IR communication protocol between a transmitter of switching device 104 and a receiver of an electronic device may be unreliable (such as where a line of sight exists, but a relatively large distance exists between the two devices).

A user may also assign or modify particular command types to particular communication protocols, assign or modify a prioritization of communication protocols to use for one or more command types, and/or modify any other manner in which protocol determination and selection logic 114 selects a communication protocol as described herein. For instance, if an RF or IP-based signal (using a wireless network connection) is unreliable, user preference information 318 may set a lower priority for such communication protocols. In such an example, therefore, protocol selector 304 may select one or more other communication protocols based on user preference information 318 to transmit a control signal to the electronic device.

It is noted and understood that protocol selector 304 is not limited to selecting a communication protocol from among a plurality of communication protocols using the above techniques. Protocol selector 304 may select a communication in any other manner, including, but not limited to, combination of one or more of the above techniques. Furthermore, protocol selector 304 may be configured to select multiple communication protocols from among the plurality of communication protocols in some implementations (e.g., to send control signals corresponding to the same command simultaneously and/or in a successive fashion).

Figure 5:
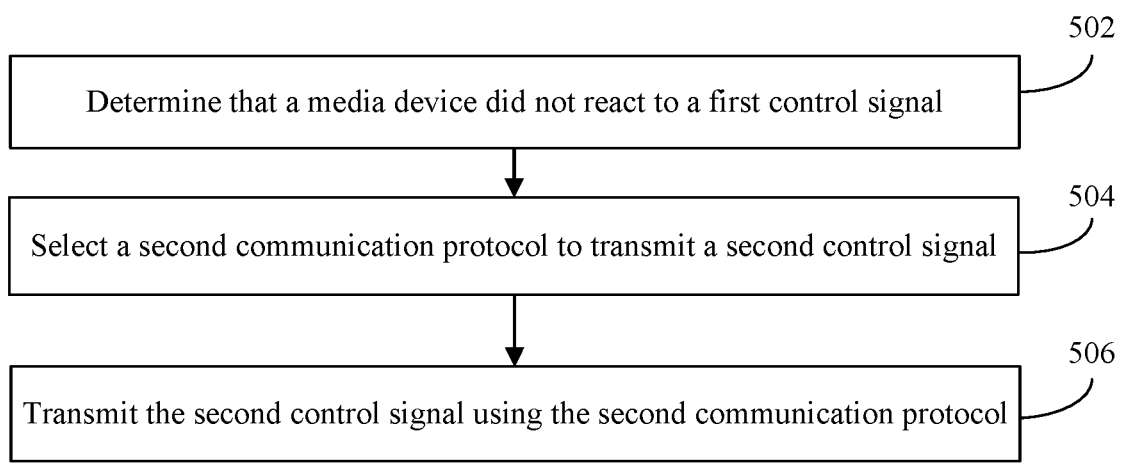
FIG. 5 is a flowchart of a method for selecting a second communication protocol in response to a determination that the media device did not react to a first control signal, according to an example embodiment.

As described above, protocol selector 304 may be configured to select a secondary or alternative communication protocol in some example embodiments. For instance, FIG. 5 is a flowchart of a method for selecting a second communication protocol in response to a determination that the media device did not react to a first control signal, according to an example embodiment. For illustrative purposes, FIG. 5 will be described with continued reference to systems 100 and 300 of FIGS. 1 and 3, respectively. Other structural and operational embodiments will be apparent to persons skilled in the relevant art(s) based on the discussion regarding flowchart 500 and the systems of FIGS. 1 and 3. Flowchart 500 and systems 100 and 300 are described in further detail as follows.

Flowchart 500 begins with step 502. In step 502, it is determined that a media device did not react to a first control signal. For instance, with reference to FIGS. 1 and 3, protocol selector 304 may determine that one of electronic device(s) 102 for which a control signal was transmitted using a first communication protocol did not react to the transmitted control signal. In one illustrative example, protocol selector 304 may select a first control signal, such as an IP control signal, in a manner as described above and one of transmitter(s) 312 may transmit first control signal using the selected communication protocol to a particular electronic device.

Protocol selector 304 may be configured to determine that the electronic device did not react or receive the transmitted control signal in a number of ways, such as by analyzing an audio or video signal received from the electronic device to determine whether the electronic device. For instance, protocol selector 304 may analyze an audio and/or video signal received over HDMI cable 108 to verify whether the device changed a state (e.g., woke up from a sleep mode, applied a navigation command, adjusted a volume setting, etc.) corresponding to the transmitted control signal.

In some instances, however, the electronic device may not react to the transmitted control signal for any number of reasons (e.g., due to interference, a physical obstruction, the device being in a sleep state, etc.). For example, if one of transmitter(s) 312 transmitted IR control signal 124A to power on one of electronic device(s) 102, but the electronic device did not respond by powering on, protocol selector 304 may determine that the electronic device did not react to the first control signal.

It is noted, however, that implementations are not limited to analyzing an audio and/or video signal to determine whether an electronic device properly reacted to a control signal, but may include other implementations as well. For instance, protocol selector 304 may determine that an electronic device did not react to a control signal based on a user input (e.g., via an interactive prompt on a display or a voice command). In some other examples, protocol selector 304 may determine that an electronic device did not react to a control signal based on a user-initiated control request that is an identical request to a previously transmitted control request. For instance, if control request 322 comprises a request that is the same as one transmitted previously, protocol selector 304 may infer that a first control signal to carry out the first control request was not properly received by the electronic device. In yet another example, protocol selector 304 may be configured to make such a determination based on whether an acknowledgement is received (or not received) from the electronic device(s) 102 verifying the receipt and/or application of the first control signal.

In step 504, a second communication protocol is selected to transmit a second control signal. For instance, with reference to FIG. 3, in response to determining that the electronic device did not react to the first control signal, duplicate transmission selector 308 may be configured to select a second communication protocol from among the plurality of communication protocols to transmit a second control signal corresponding to the same control request 322. In some example implementations, duplicate transmission selector 308 may select the second communication protocol as an alternative communication protocol automatically upon determining that the electronic device did not react to the first control signal, thereby enabling a seamless control of the electronic device. In some other instances, however, duplicate transmission selector 308 may select a second communication protocol based, for instance, on a user-initiated action (e.g., a user request to retransmit a command to the electronic device via a prompt, remote control, etc.).

In one non-limiting example, if one of transmitter(s) 312 transmitted IR control signal 124A to power on one of electronic device(s) 102, but electronic device did not respond by powering on, duplicate transmission selector 308 may thereby select a second communication protocol from among the plurality of communication protocols to transmit a second control signal to attempt to power on the same electronic device. For instance, device to protocol mapping 120 may indicate that a power command may be suitable for communication with electronic device(s) 102 via an IR, HDMI-CEC and/or RF protocol as a secondary option. In this illustrative example, duplicate transmission selector 308 may select an appropriate second communication protocol (e.g., based on a prioritization or in any other manner as described herein) to transmit a second control signal corresponding to control request 322.

In step 506, the second control signal may be transmitted to the media device using the second communication protocol. For instance, with reference to FIG. 3, one of transmitter(s) 312 may be configured to transmit a second control signal corresponding to the same control request using the second communication protocol. Transmitter(s) 312 may transmit the second control signal using any of the selected communication protocols in a similar manner as described above with respect to the transmission of a first control signal. In this manner, protocol selector 304 may automatically determine which protocols to select to communicate with electronic device(s) 102, and automatically re-transmit one or more additional commands in the event electronic device(s) 102 did not properly react to the transmission of a first control signal using a first communication protocol.

It is noted and understood that the second control signal using a second communication protocol different from a first communication protocol (and/or any subsequent control signals) may be transmitted using the same one of transmitter(s) 312 and/or a different one of transmitter(s) 312. For instance, any one of transmitter(s) 312 may be configured to transmit control signals using a plurality of different communication protocols. In some other implementations, however, control signals transmitted over different communication protocols may be carried out by a plurality of different transmitter(s) (e.g., a separate transmitter for RF control signals and an IR control signal).

In accordance with other example embodiments, duplicate transmission selector 308 may be configured to retransmit a first control signal using the same first communication protocol. For instance, where an electronic device did not react to a first control signal, duplicate transmission selector 308 may retransmit the same control signal using the same communication protocol instead of selecting a second communication protocol as described above. In a further example embodiment, duplicate transmission selector 308 may be configured to select a second communication protocol for controlling an electronic device upon a predetermined number of failures to properly transmit a control signal using the first communication protocol. Implementations are not limited to these illustrative examples and may include any other manner of automatically selecting alternative or backup communication protocols in response to determining that an electronic device did not properly respond to a first attempted control signal.

Figure 6:
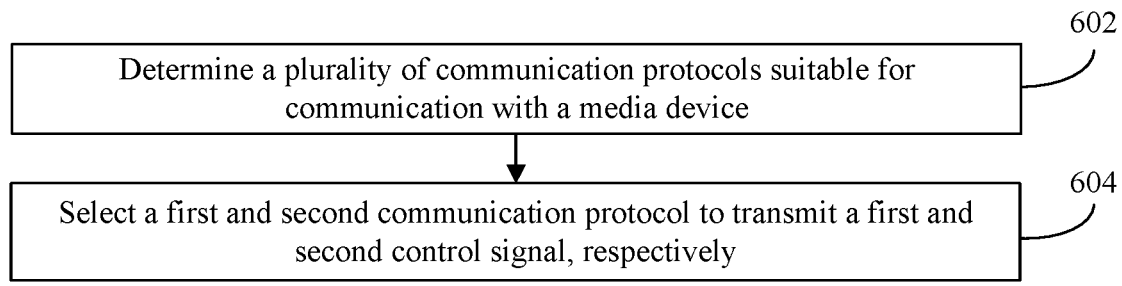
FIG. 6 is a flowchart of a method for selecting a first and second communication protocol to transmit first and second control signals, respectively, according to an example embodiment.

As described above, protocol selector 304 may be configured to select a plurality of communication protocols in some example embodiments. For instance, FIG. 6 is a flowchart of a method for selecting a first and second communication protocol to transmit first and second control signals, respectively, according to an example embodiment. For illustrative purposes, FIG. 6 will be described with continued reference to systems 100 and 300 of FIGS. 1 and 3, respectively. Other structural and operational embodiments will be apparent to persons skilled in the relevant art(s) based on the discussion regarding flowchart 600 and the systems of FIGS. 1 and 3. Flowchart 600 and systems 100 and 300 are described in further detail as follows.

Flowchart 600 begins with step 602. In step 602, a plurality of communication protocols suitable for communication with a media device is determined. For instance, with respect to FIGS. 1 and 3, communication protocol identifier 302 may determine a plurality of communication protocols for which switching device 104 may communicate with one of electronic device(s) 102. In example implementations, step 602 of flowchart 600 may be carried out in a similar manner as described above with respect to step 204 of flowchart 200.

In step 604, a first and second communication protocol are selected to transmit a first and second control signal, respectively. For instance, with reference to FIGS. 1 and 3, protocol selector 304 may select more than one of the communication protocols from among the plurality of communication protocols to transmit a first and second control signal to one of electronic device(s) 102. In examples, the first and second control signals may be transmitted via the same one of transmitter(s) 312 or a plurality of transmitter(s) 312 as described herein. For instance, in some implementations, protocol selector 304 may determine that a plurality of control signals, such as a sequence of commands or control signals, is to be transmitted to one of electronic device(s) 102 in response to control request 322 (e.g., a user-initiated request). In such implementations, protocol selector 304 may be configured to select a plurality of different communication protocols for successive, simultaneous, or near-simultaneous transmission to the electronic device for transmitting different control signals.

In an illustrative example, control request may comprise a request to launch a particular application on a media device that is not currently powered on. In this example, protocol selector 304 may select a first IR control signal (e.g., IR control signal 124A) to power on the media device for transmission over an IR communication protocol, and select a second control signal (e.g., an RF control signal 126A, IP control signal 116A, and/or HDMI-CEC control signal 108A) using a different communication protocol for transmission to the media device to navigate the media device to launch the particular application. Upon selection of a first and second communication protocol, one or more of transmitter(s) 312 may transmit first and second control signals using the selected communication protocols to the media device in similar manner as described above. In this manner, switching device 104 can adaptively and automatically communicate with an electronic device using multiple different communication protocols with minimal user input.

In another illustrative example, such as where a user may desire to power on a television to watch content from a particular media device, protocol selector 304 may power on the television with one communication protocol (e.g., an IR communication protocol), change an input of the television using another communication protocol (e.g., an IP or HDMI-CEC protocol), and/or change a volume of the television using another communication protocol (e.g., an RF communication protocol). Implementations are not limited to these illustrative examples, and may include any other combination of selecting and transmitting control signals to a media device (or a plurality of media devices) using multiple communication protocols.

Figure 7:
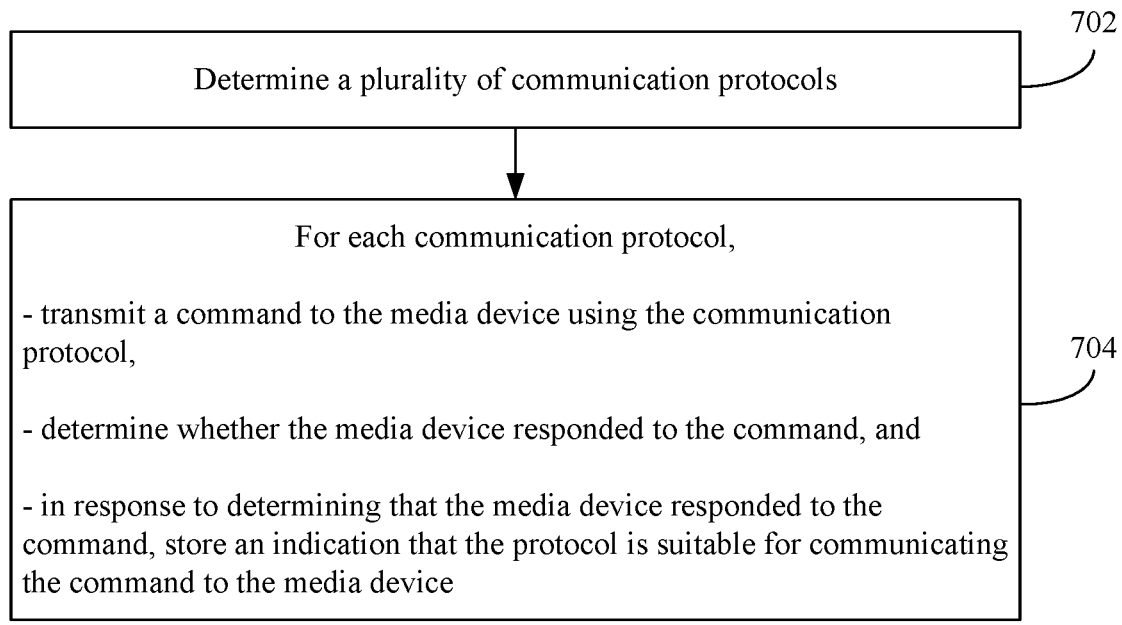
FIG. 7 is a flowchart of a method for storing an indication that a communication protocol is suitable for communication with a media device, according to an example embodiment.

In accordance with some embodiments, switching device 104 may be configured to determine whether one or more communication protocols are suitable for communication with a media device. For instance, FIG. 7 depicts a flowchart 700 of an example method for storing an indication that a communication protocol is suitable for communication with a media device, according to an example embodiment. For illustrative purposes, FIG. 7 will be described with continued reference to systems 100 and 300 of FIGS. 1 and 3, respectively. Other structural and operational embodiments will be apparent to persons skilled in the relevant art(s) based on the discussion regarding flowchart 700 and the systems of FIGS. 1 and 3. Flowchart 700 and systems 100 and 300 are described in further detail as follows.

Flowchart 700 begins with step 702. In step 702, a plurality of communication protocols is determined. For example, with reference to FIG. 3, protocol testing logic 316 may be configured to which communication protocols are available on switching device 104 based on a hardware and/or software configuration of switching device 104. For instance, protocol testing logic 316 may determine that switching device 104 contains an HDMI interface 108 capable of communication over an HDMI-CEC protocol, a network interface 116, an RF transmitter 126, and/or an IR transmitter 124, each of which may be capable of transmitting control signals to another device.

In step 704, for each communication protocol, a command is transmitted to the media device using the communication protocol, a determination is made whether the media device responded or reacted to the command, and in response to the determination, an indication is stored that the protocol is suitable for communicating the command to the media device. For instance, with reference to FIG. 3, protocol testing logic 316 may cause command generator 310 to transmit a command (e.g., a test command to power on a device) over each of a plurality of available communication protocols. In embodiments, more than one command may be transmitted to one of electronic device(s) 102. For instance, protocol testing logic 316 may cause a plurality of different command types (e.g., a navigation command, a power or wake command, a volume command, etc.) to one of electronic device(s) 102 in order to determine whether one of electronic device(s) 102 properly responds or reacts to each command type using the communication protocol.

Upon transmitting a command to one of electronic device (s) 102, it is determined whether the device responded to the command. For instance, as described earlier, protocol determination and selection logic 114 may automatically determine, based on a video and/or audio signal from one of electronic device(s) 102, or in any other manner described herein, whether the command transmitted using the communication protocol was successfully applied to the media device. In another embodiment, protocol determination and selection logic 114 may determine, based on an input received from a user, such as via an interactive user prompt, whether the electronic device responded to the command transmitted using the communication protocol.

In response to determination that the electronic device properly responded or reacted to the command transmitted using the communication protocol, an indication is stored (e.g., in device to protocol mapping 120) that the communication protocol is suitable for communicating the command to the electronic device. For instance, if it is determined that an electronic device responded to a power signal transmitted using an IR protocol, an indication (e.g., a rule, prioritization, etc.) may be stored in device to protocol mapping 120 that power commands are suitable for transmission to the electronic device using an IR protocol.

In accordance with embodiments described herein, step 704 may be repeated for each communication protocol determined in step 702. In this manner, protocol testing logic 316 may determine how each electronic device responds to different types of commands transmitted using different communication protocols available on switching device 104. For instance, it may be determined that certain commands (e.g., power commands) are communicated more effectively or reliably using certain protocols (e.g., an IR protocol). Using this information, protocol selector 304 may automatically determine how to communicate with connected electronic device with minimal user involvement, in accordance with the techniques described herein.

Indications stored in device to protocol mapping 120 may be stored locally (e.g., on switching device 104) on a suitable storage device, and/or may be transmitted to one or more other devices. For instance, indications stored in device to protocol mapping 120 may be transmitted to a central server to be placed in a repository. In embodiments, the central server may transmit one or more of such indications to other switching devices, enabling the other switching devices to avoid and/or streamline a process of determining a mapping for coupled electronic device. In other embodiments, a switching device may obtain indications for a particular electronic device from another device (e.g., a cloud-based server), and verify, based on the particular user's setup, whether switching device 104 can communicate with the electronic device using the communication protocols specified in the obtained indications.

III. Further Example Embodiments and Advantages

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The adaptive multi-protocol control embodiments and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

Figure 8:
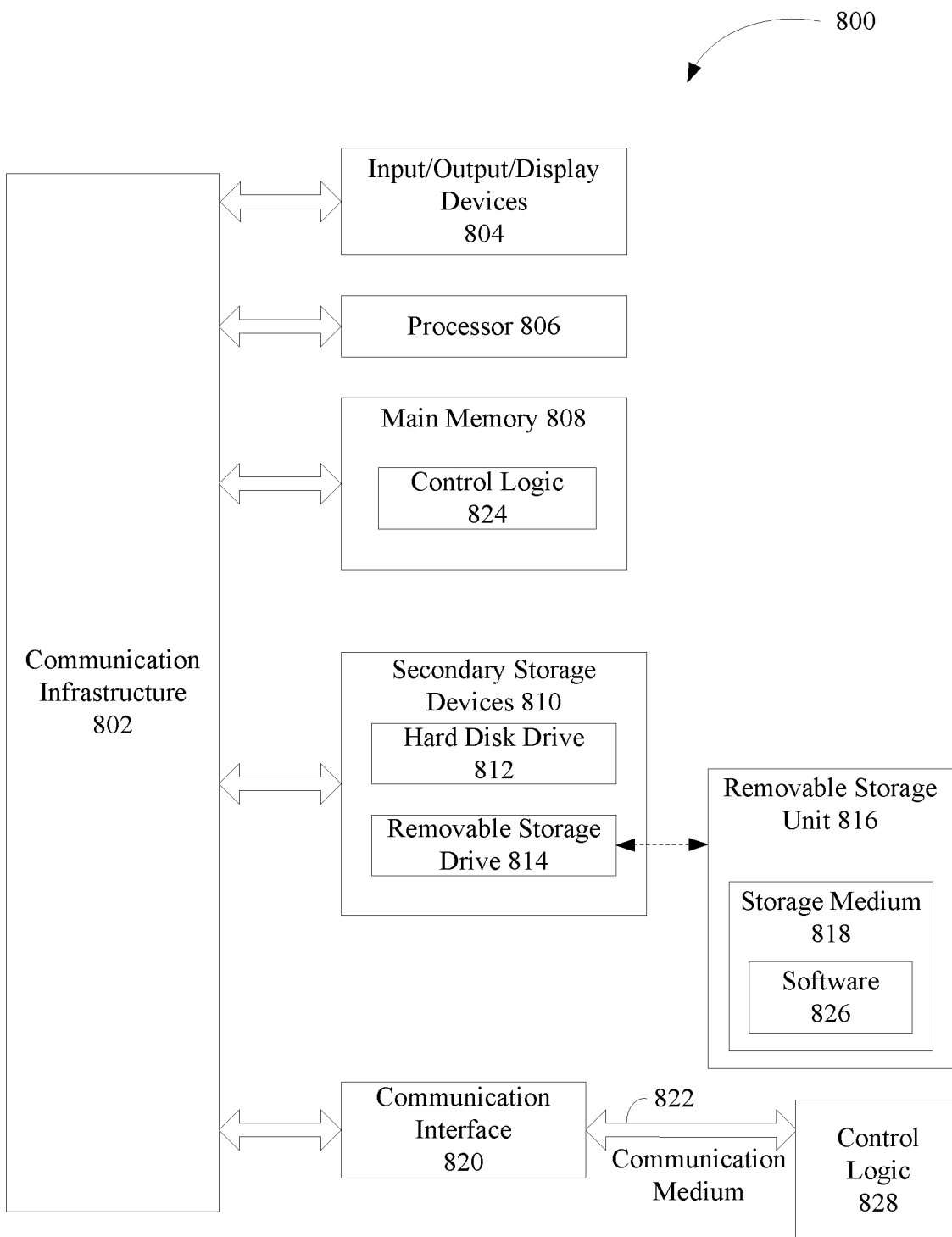
FIG. 8 is a block diagram of an example computer system in which embodiments may be implemented.

The embodiments described herein, including systems, methods/processes, devices, and/or apparatuses, may be implemented using well known processing devices, telephones (smart phones and/or mobile phones), tablet computers, servers, and/or, computers, such as a computer 800 shown in FIG. 8. It should be noted that computer 800 may represent communication devices, processing devices, servers, and/or traditional computers in one or more embodiments. For example, the automatic navigation of consumer electronic devices embodiments, and any of the sub-systems or components respectively contained therein, may be implemented using one or more computers 800 or portions thereof.

Computer 800 can be any commercially available and well-known communication device, processing device, and/or computer capable of performing the functions described herein, such as devices/computers available from International Business Machines®, Apple®, Sun®, HP®, Dell®, Cray®, Samsung®, Nokia®, etc. Computer 800 may be any type of computer, including a desktop computer, a server, etc.

Computer 800 includes one or more processors (also called central processing units, or CPUs), such as a processor 806. Processor 806 is connected to a communication infrastructure 802, such as a communication bus. In some embodiments, processor 806 can simultaneously operate multiple computing threads.

Computer 800 also includes a primary or main memory 808, such as random-access memory (RAM). Main memory 808 has stored therein control logic 824 (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well-known manner.

Computer 800 also includes input/output/display devices 804, such as touchscreens, LED and LCD displays, monitors, keyboards, pointing devices, etc.

Computer 800 further includes a communication or network interface 818. Communication interface 820 enables computer 800 to communicate with remote devices. For example, communication interface 820 allows computer 800 to communicate over communication networks or mediums 822 (representing a form of a computer useable or readable medium), such as LANs, WANs, the Internet, etc. Network interface 820 may interface with remote sites or networks via wired or wireless connections.

Control logic 828 may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments of the invention.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, IR, and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 8) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 806 of FIG. 8), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

It is noted that while FIG. 8 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system for controlling a media device, the system comprising:
one or more transmitters;
one or more processors; and
one or more memory devices that store program code configured to be executed by the one or more processors, the program code comprising:
a communication protocol identifier configured to:
determine a plurality of communication protocols suitable for communication with the media device based on a mapping that identifies protocols suitable to communicate with each of a plurality of device brands, makes, or models, and
prioritize each of the plurality of communication protocols based at least on a media system configuration; and
a protocol selector configured to:
determine a current state of the media device; and
select a first communication protocol and a second communication protocol from the plurality of communication protocols based at least on the prioritization of each of the plurality of communication protocols and the current state of the media device, the one or more transmitters configured to transmit a first control signal to the media device using the first communication protocol and a second control signal to the media device using the second communication protocol.

2. The system of claim 1, wherein the protocol selector is configured to select at least one of the first or second communication protocols based, at least in part, on a power state of the media device.

3. The system of claim 1, wherein the protocol selector is configured to select the first communication protocol based, at least in part, on a determination that a network connection with the media device is not available.

4. The system of claim 1, wherein the protocol selector is configured to select at least one of the first or second communication protocols based, at least in part, on a received request.

5. The system of claim 1, wherein the protocol selector is configured to select at least one of the first or second communication protocols based, at least in part, on a user preference.

6. The system of claim 1, wherein the plurality of communication protocols includes at least one of:
an infrared (IR) protocol;
a radio-frequency (RF) protocol;
an Internet Protocol (IP); or
a High-Definition Multimedia Interface (HDMI-CEC) protocol.

7. A method of controlling a media device, the method comprising:
receiving a request to control the media device;
determining a plurality of communication protocols suitable for communication with the media device based on a mapping that identifies protocols suitable to communicate with each of a plurality of device brands, makes, or models;
prioritizing each of the plurality of communication protocols based at least on a media system configuration;
determining a current state of the media device;
selecting a first communication protocol from among the plurality of communication protocols to transmit a first control signal corresponding to the request, the selecting being based at least on the prioritization of each of the plurality of communication protocols and the current state of the media device; and
transmitting the first control signal to the media device using the first communication protocol.

8. The method of claim 7, wherein the selecting comprises selecting the first communication protocol based, at least in part, on a power state of the media device.

9. The method of claim 7, wherein the selecting comprises selecting the first communication protocol based, at least in part, on a determination that a network connection with the media device is not available.

10. The method of claim 7, wherein the selecting comprises selecting the first communication protocol based, at least in part, on the received request.

11. The method of claim 7, wherein the selecting comprises selecting the first communication protocol based, at least in part, on a user preference.

12. The method of claim 7, wherein the plurality of communication protocols includes at least one of:
an infrared (IR) protocol;
a radio-frequency (RF) protocol;
an Internet Protocol (IP); or
a High-Definition Multimedia Interface (HDMI-CEC) protocol.

13. The method of claim 7, further comprising:
determining that the media device did not react to the first control signal; and
in response to determining that the media device did not react to the first control signal, selecting a second communication protocol from among the plurality of communication protocols to transmit a second control signal corresponding to the request; and
transmitting the second control signal to the media device using the second communication protocol.

14. The method of claim 7, further comprising:
transmitting a second control signal to the media device using a second communication protocol that is different than the first communication protocol.

15. A system for controlling a media device, the system comprising:
a receiver configured to receive a request to control the media device;
a first transmitter;
one or more processors; and
one or more memory devices that store program code configured to be executed by the one or more processors, the program code comprising:
a communication protocol identifier configured to:
determine a plurality of communication protocols suitable for communication with the media device based on a mapping that identifies protocols suitable to communicate with each of a plurality of device brands, makes, or models, and
prioritize each of the plurality of communication protocols based at least on a media system configuration; and
a protocol selector configured to:
determine a current state of the media device; and
select a first communication protocol from among the plurality of communication protocols based at least on the prioritization of each of the plurality of communication protocols and the current state of the media device, the first transmitter being configured to transmit a first control signal corresponding to the request to the media device using the first communication protocol.

16. The system of claim 15, wherein the protocol selector is configured to select the first communication protocol based, at least in part, on a power state of the media device.

17. The system of claim 15, wherein the protocol selector is configured to select the first communication protocol based, at least in part, on a determination that a network connection with the media device is not available.

18. The system of claim 15, further comprising:
a second transmitter; and
wherein the protocol selector is configured to:
   determine that the media device did not react to the first control signal; and
   in response to determining that the media device did not react to the first control signal, select a second communication protocol from among the plurality of communication protocols to transmit a second control signal to the media device using the second transmitter.

19. The system of claim 1, wherein the mapping further identifies one or more command types that may be communicated to each of the plurality of device brands, makes, or models over a given communication protocol.

20. The method of claim 7, wherein the mapping further identifies one or more command types that may be communicated to each of the plurality of device brands, makes, or models over a given communication protocol.

* * * * *